United States Patent [19]

Coughlan et al.

[11] Patent Number: 4,533,600

[45] Date of Patent: Aug. 6, 1985

[54] SEALANT SHEET MATERIAL

[75] Inventors: Raymond T. Coughlan, Darien; Suzette M. Bojarski, Tinley Park, both of Ill.

[73] Assignee: Daubert Coated Products Inc., Chicago, Ill.

[21] Appl. No.: 604,044

[22] Filed: Apr. 26, 1984

[51] Int. Cl.³ .......................... B32B 27/38; C09J 7/02
[52] U.S. Cl. .................................... 428/414; 428/355; 428/354; 428/352; 428/451; 428/514; 427/372.2
[58] Field of Search ............... 428/355, 354, 352, 414, 428/451, 514

[56] References Cited

U.S. PATENT DOCUMENTS 4,157,410 6/1979 McClintock ..................... 428/352
4,272,573 6/1981 Ewald et al. ..................... 428/355
4,288,480 9/1981 Grzywinski et al. .............. 428/352

FOREIGN PATENT DOCUMENTS 0154437 3/1982 Fed. Rep. of Germany ...... 428/514

Primary Examiner—Patricia C. Ives
Attorney, Agent, or Firm—Wallenstein, Wagner, Hattis, Strampel & Aubel

[57] ABSTRACT

A low cost sheet material, and a method of preparing same, which is useful as a substrate for casting sealants and adhesives. The substrate comprises a highly calendered, smooth grade kraft paper having a coating of an elastomer modified polyvinyl chloride on each of the major surfaces thereof. Either one, or both, of the polyvinyl coatings are provided with a film of a release agent thereon.

10 Claims, 2 Drawing Figures

SEALANT SHEET MATERIAL

TECHNICAL FIELD

The present invention relates to a sheet material adapted for use as a substrate for casting sealant or adhesive compositions.

BACKGROUND OF THE PRIOR ART

It is the usual practice in the sealant and wet casting adhesive industry to employ polyethylene coated kraft paper as a substrate for casting both sealants and adhesives. While polyethylene coated kraft paper has good dimensional stability when it is exposed to moisture or high humidity, it has poor heat resistance, being limited to exposure to temperatures not exceeding 260° F. As a consequence of the low heat tolerance of polyethylene coated kraft paper, casters, whether they are using sealants or adhesives, must operate at relatively low speeds and low temperatures to avoid melting the polyethylene layer. A further disadvantage encountered by casters, especially adhesive casters, in the use of polyethylene coated kraft paper, centers on the relatively low porosity of such a substrate. More specifically in this connection, because of the relatively low porosity of such substrates, the solvent vehicle for the adhesive, during drying, can only escape through the top of the structure, that is, through the adhesive layer. If the drying conditions are not properly controlled and there is skinning over of the adhesive before all of the solvent has been driven off, bubbles or blisters can form in the adhesive, thereby adversely affecting the bond strength of the adhesive layer. Wholly apart from the aforementioned shortcomings of polyethylene coated kraft paper as a substrate for sealant and adhesive casting, the coated paper is comparatively costly to produce both from the standpoint of material costs as well as equipment costs.

BRIEF SUMMARY OF THE INVENTION

In accordance with the present invention, a low cost substrate especially adapted for sealant and wet adhesive casting operations has been evolved which is superior to polyethylene coated kraft paper used for the same purpose. Briefly, the substrate of this invention comprises a base layer formed of a highly calendered, smooth grade kraft paper. Each side of the base layer is provided with a coating of a resin composition. The resin composition coatings, in turn, are provided with a film of a release agent. The release agent films, in one embodiment of the invention, may be formulated to impart differential release coating properties to each side of the substrate. The resin composition employed to coat the kraft paper base layer may be modified to impart various desired properties to the substrate. The finished substrate is characterized by its excellent moisture stability in that it undergoes no change in dimensions and exhibits no curl under humid conditions. In addition, the substrate has excellent hold-out properties, that is, it is an effective barrier to penetration by such substances as oils, resins and solvents. The substrate is further characterized by its excellent heat resistance, being able to withstand temperatures ranging upwards of 400° F. It should also be mentioned that, while the substrate has excellent hold-out capabilities, it is "breathable", that is, thick adhesive masses in solvent vehicles are able to back-diffuse through the substrate without causing fisheyes, blisters, or bubbles on the surface. The substrate has excellent release properties enabling easy unwind of sealants to be achieved on one or both sides of the substrate, or, in the case where differential release films are provided on the substrate, easily controlled differential release on one surface of the substrate.

DETAILED DESCRIPTION OF THE INVENTION

Figure 1:
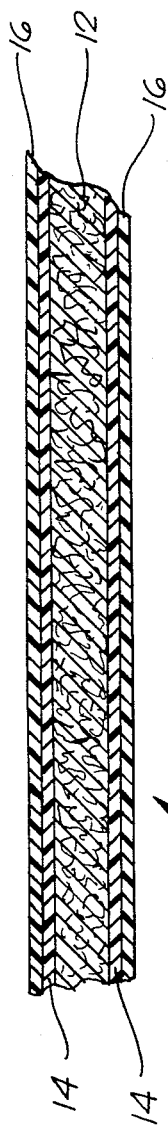
FIG. 1 is an enlarged, fragmentary vertical sectional view of an embodiment of the substrate of the present invention.

The embodiment of the substrate of the present invention illustrated in FIG. 1, and designated generally by reference numeral 10, comprises a supporting base material layer 12 having a continuous coating 14 of a resin composition on each of the main surface areas thereof. Each coating 14, in turn, desirably is provided with a continuous, thin film or layer 16 of a release agent. In a typical sealant, or wet adhesive casting operation, a continuous film or layer (not shown) of a sealant or adhesive of predetermined properties and loadings is cast upon one of the films or layers 16 of the release agent. The resulting structure is then usually formed into a roll for shipment and use.

While the supporting base material layer 12 may be formed of various fibrous cellulosic sheet materials such as bleached paper, and the like, as well as papers made from pulps prepared by chemical, mechanical or chemical-mechanical processes other than the kraft process, a highly calendered smooth grade kraft paper is preferred. Kraft papers of this type are referred to in the trade as converting smooth grade kraft. The generally optimum objectives of the invention are attained with a supporting base material layer formed of a converting smooth grade kraft paper having a basis of about 25 to about 100, preferably about 35 to about 80 pounds per ream; a surface smoothness, as measured by the Sheffield Smoothness test, of less than about 350, preferably between about 290 to about 320; and a resistance to penetration, as measured on a Hercules Sizing Tester, of the order of about 10 to about 40 seconds, preferably about 25 to about 30 or 35 seconds. The Sheffield Smoothness test and the Hercules Sizing Tester are well known to those skilled in the art.

The resin composition which is applied to the supporting base material layer of the substrate of this invention advantageously comprises a vinyl polymer which has been modified with an elastomer, especially a nitrile rubber. Exemplary of vinyl polymers which can be used to form the resin compositions are polyvinyl chloride, vinyl chlorideacetate copolymers, vinylidene chloride-vinyl chloride copolymers, and the like. The preferred vinyl polymer is polyvinyl chloride. The nitrile rubbers employed as modifying agents in formulating the compositions advantageously are copolymers of unsaturated nitriles with dienes, especially desirably copolymers of butadiene and acrylonitrile. Specific examples of other elastomers which can be used, but, for various reasons are less preferred, are chlorinated rubber, polychloroprene, rubber hydrochloride, carbocyclic elastomers, silicone rubber, or the like. Modified resin compositions useful for the purposes of this invention are commercially available. Thus, for example, excellent results can be attained with a polyvinyl chloride emulsion modified with a nitrile rubber sold under the designation "GEON 552" (B. F. Goodrich). The resin compositions can be further modified by the addition, for example, of an epoxy resin, a UV stabilizer and an antioxidant. Extenders and/or thickening agents exemplified by crosslinked starches, polyacrylates and polyvinyl alcohol can also be used to provide a resin composition having desired properties. The resin compositions advantageously should have a solids content of the order of about 30% to about 60%, preferably about 40% to about 50%, and a viscosity in the range of about 90 to about 120, preferably about 100 centipoises (Brookfield Model LVF, No. 3 spindle, at 30 rpm). The loadings of the resin composition coatings 14 on each side of the base material layer 12 of the substrate of this invention desirably should be about 2 to about 6, preferably about 4 to 5 dry pounds per ream per side.

The silicone release film applied to either one, or both, coatings 14 of the resin composition can be selected from a relatively wide group. As indicated hereinabove, a different release film may be applied to each of the resin coatings to provide a substrate having differential release capabilities. Exemplary of release coating compositions which can be used are aqueous emulsions of organopolysiloxanes to which a binder has been added. A catalyst is employed as a curing or crosslinking agent for the silicone compound. The preferred organopolysiloxane emulsions useful for the purposes of this invention can be selected from a number of commercially available products, included among which is the aqueous dimethylpolysiloxane emulsion sold under the trade designation "SYL-OFF 22" (Dow-Corning). Also useful are organopolysiloxanes sold under the trade designations "SYL-OFF 1171" (Dow-Corning), "ARSIL 302-E" (ARJAY), AND "L-7002" (Union Carbide).

The catalysts employed to initiate curing or crosslinking of the organopolysiloxane used to form the release film, or films, of the substrate also are commercially available. Specific examples of such catalysts are tin octoate, zinc octoate, tin butyrate, and dibutyl tin diacetate, to name a few. Preferred catalysts are those sold under the trade designations "SYL-OFF 1171-A" and "SYL-OFF 22A" (Dow-Corning).

The binders utilized in conjunction with the organopolysiloxanes for use in forming the release films of the substrate include water soluble cellulosics exemplified by carboxymethyl cellulose, methyl cellulose, hydroxyethyl cellulose, ethyl cellulose, and hydroxypropyl methyl cellulose. Of the foregoing, carboxymethyl cellulose is preferred.

In those instances where it is desired to provide a substrate having silicone release films which are characterized by their differential release properties, release coating compositions such as those disclosed in copending U.S. patent application Ser. No. 483,765, filed April 11, 1983, now U.S. Pat. No. 4,454,266, can be used to advantage. As taught therein, the release coating compositions comprise, as essential active ingredients, a binder, a silicone compound, a catalyst, and a terpolymer, especially a terpolymer formed of monomers selected from the group consisting of ethylenically unsaturated aliphatic monocarboxylic acids, and esters of such acids, and mixtures thereof. The preferred binder used in the composition of the patent is hydroxyethylcellulose, while the preferred silicone compound is an aqueous dimethylpolysiloxane emulsion of the type sold under the trade designation "SYL-OFF 22". The preferred terpolymer is a commercially available product, sold under the designation "E-358" (Rohm & Haas), comprising approximately 1% acrylic acid, 15% acrylonitrile, 34% 2-ethyl-hexylacrylate and 50% ethylacrylate. A catalyst such as "SYL-OFF 1176-A" is used to cure the polysiloxane. As disclosed in the patent, the release coating composition comprising the binder, the silicone compound, the catalyst, and the terpolymer is applied to one side of a polyethylene coated kraft paper liner. A second release coating composition comprising a binder and a silicone compound are applied to the opposite side of the plastic film coated kraft paper liner. The resulting structure, as described in the patent, has differential release capabilities which make it especially suitable for use in the manufacture of rolled pressure sensitive label transfer tapes.

The amount of the silicone composition applied to the resin composition coatings 14 of the substrate of this invention to form the release film, or films, 16 is somewhat variable. The generally optimum objectives of the invention, however, are attained with loadings of the order of about 1 to about 3, preferably about 1.5 to about 2 to 2.5, pounds per ream per side of the substrate.

Figure 2:
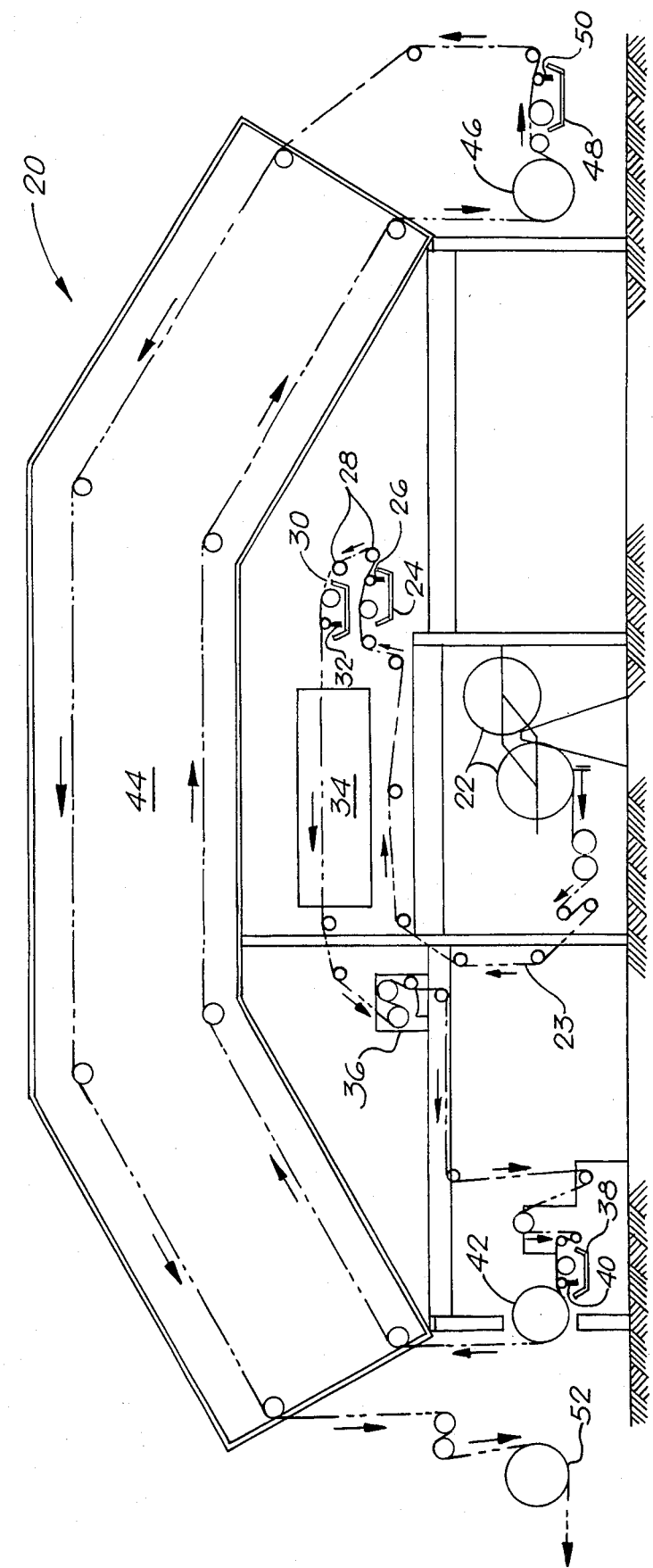
FIG. 2 is a schematic representation of coating apparatus for use in the fabrication of the substrate.

Referring, now, to FIG. 2 of the drawing, an embodiment is schematically illustrated of coating apparatus which can be used to manufacture the substrate of the present invention. The apparatus, as shown, and designated generally by reference numeral 20, includes feed rolls 22–22 from which a highly calendered, smooth grade kraft paper 23, in sheet form, is continuously fed to a first coating station 24 where one side of the kraft paper is coated, as by means of a Meyer rod 26, with a solution of the resin composition. The direction of the kraft paper desirably is then reversed by rollers 28–28, and the opposite, or other side of the paper is coated at a second coating station 30 as by means of a Meyer rod 32. The thusly coated kraft paper sheet is directed from the second coating station 30 through an oven 34 where the coatings are dried at a web temperature ranging from about 230° F. to about 300° F., preferably about 250° F. to about 275° F. Following drying, the coated paper is advantageously first cooled at a cooling drum station 36, and then directed to a third coating station 38 where a thin film of a silicone release agent is applied, as by a Meyer rod 40, to one side of the resin composition coated kraft paper. The release agent coated substrate is then passed over a cooling drum 42 and into an oven 44 where the release agent film is dried and cured at a temperature of about 275° F. to about 375° F., preferably about 300° F. to about 350° F. As the substrate leaves the oven 44, it is desirably passed over a cooling drum 46, and then to a fourth coating station 48 where a film of a release agent is applied, as by a Meyer rod 50, to the side of the substrate which was not coated at the third coating station 38. The direction of the completely coated substrate is again reversed, and the substrate is passed through the oven 44 a second time to dry and cure the silicone release agent film applied to the substrate at the coating station 48. The finished substrate, as it leaves the oven 44, is then passed over a heated drum 52 from where it is directed to a winder (not shown). The rate of travel, or line speed, of the web through the coating stations 24, 30, 38 and 48, and the ovens 34 and 44 can range from about 100 to about 250, preferably about 150 to about 200 feet per minute. It should be understood, of course, that the substrate can be produced in several separate passes on conventional coating production lines. However, the use of such conventional techniques adds to the manufacturing costs of the substrate.

The following examples are illustrative of specific coating and film forming compositions for use in the manufacture of the substrate of the present invention. The ingredients of the compositions are shown in dry parts by weight.

EXAMPLE I

| Ingredient | Parts (Dry) |
| --- | --- |
| A. Resin composition | |
| 1. Polyvinyl chloride modified with nitrile rubber (GEON 552) | 100. |
| B. Silicone release agent | |
| 1. Carboxymethyl cellulose | 4.5 |
| 2. SYL-OFF 1171 | 20.0 |
| 3. SYL-OFF 1171A | 1.5 |

EXAMPLE II

| Ingredient | Parts (Dry) |
| --- | --- |
| A. Resin Composition | |
| 1. Polyvinyl chloride modified with nitrile rubber (GEON 552) | 85.7 |
| 2. Starch (AMAIZO'S) | 14.1 |
| 3. Urea formaldehyde (UFORMITE 917-MONSANTO) | 0.2 |
| B. Silicone release agent | |
| 1. Carboxymethyl cellulose | 4.0 |
| 2. SYL-OFF 22 | 8.2 |
| 3. SYL-OFF 22A | 1.0 |

EXAMPLE III

| Ingredient | Parts (Dry) |
| --- | --- |
| A. Resin Composition | |
| 1. Polyvinyl chloride modified with nitrile rubber (GEON 552) | 87.5 |
| 2. Polyvinyl chloride homopolymer (GEON 351) | 12.5 |
| B. Silicone release agent | |
| 1. Carboxymethyl cellulose | 4.5 |
| 2. SYL-OFF 1171 | 20.0 |
| 3. SYL-OFF 1171A | 1.5 |

EXAMPLE IV

| Ingredient | Parts (Dry) |
| --- | --- |
| A. Resin composition | |
| 1. Polyvinyl chloride modified with nitrile rubber (GEON 552) | 95.0 |
| 2. Polyvinyl alcohol (ELVANOL 7130-DU PONT) | 5.0 |
| B. Silicone release agent | |
| 1. Carboxymethyl cellulose | 4.0 |
| 2. SYL-OFF 22 | 8.2 |

| Ingredient | Parts (Dry) |
| --- | --- |
| -continued | |
| 3. SYL-OFF 22A | 1.0 |

EXAMPLE V

| Ingredient | Parts (Dry) |
| --- | --- |
| A. Resin composition | |
| 1. Polyvinyl chloride modified with nitrile rubber (GEON 552) | 91.8 |
| 2. Antioxidant (AGERITE GT-AKRON) | 1.8 |
| 3. Epoxy resin (GENEPOXY 370-H55-DAUBERT) | 4.6 |
| 4. SYL-OFF 1171A | 1.8 |
| B. Silicone release agent | |
| 1. Carboxymethylcellulose | 4.5 |
| 2. SYL-OFF 1171 | 20.0 |
| 3. SYL-OFF 1171A | 1.5 |

What is claimed is:

1. A low cost sheet material adapted for use as a substrate on which to cast sealants or adhesives, comprising: a supporting base layer formed of a highly calendered, smooth grade kraft paper; a continuous coating of a resin composition on each of the main surface areas of the kraft paper base layer, said resin composition consisting essentially of a nitrile rubber modified polyvinyl chloride; and a continuous film of a silicone release agent on the surface of at least one of said coatings of the resin composition.

2. A sheet material according to claim 1 wherein the kraft paper base layer has a Sheffield Smoothness of less than about 350, and a penetration resistance between about 10 and about 40 seconds as measured on a Hercules Sizing Tester.

3. A sheet material according to claim 1 wherein the kraft paper base layer is a converting smooth grade kraft paper having a basis of about 25 to about 100 pounds per ream.

4. A sheet material according to claim 1 wherein the loading of the resin composition coating on the base layer is about 2 to about 6 pounds per ream per side of the base layer.

5. A sheet material according to claim 1 wherein the nitrile rubber is a copolymer of butadiene and acrylonitrile.

6. A sheet material according to claim 1 wherein a minor amount of an extender is incorporated into the resin composition.

7. A sheet material according to claim 1 wherein a minor amount of an epoxy resin and a U.V. stabilizer are incorporated into the resin composition.

8. A sheet material according to claim 7 wherein the extender is selected from the group consisting of crosslinked starch, a polyacrylate, and polyvinyl alcohol, and mixtures thereof.

9. A sheet material according to claim 1 wherein said at least one film of a release agent is formed from an emulsion of an organopolysiloxane.

10. A sheet material according to claim 1 wherein a film of a silicone release agent is provided on each of the resin composition coatings, the release agent film on one of said coatings having a different release character than that of the film of release agent on the other of said coatings.

* * * * *